United States Patent [19]
Campbell

[11] Patent Number: 6,036,281
[45] Date of Patent: Mar. 14, 2000

[54] LOW ROTATIONAL MASS BICYCLE WHEEL SYSTEM

[76] Inventor: Richard V. Campbell, 1082 U.S. Hwy. 331 North, DeFuniat Springs, Fla. 32433

[21] Appl. No.: 09/015,232

[22] Filed: Jan. 29, 1998

[51] Int. Cl.[7] .................................................. B60B 5/02
[52] U.S. Cl. ................................ 301/104; 301/58; 301/59
[58] Field of Search ................................ 301/54, 55, 58, 301/59, 61, 104, 64.7

[56] References Cited

U.S. PATENT DOCUMENTS

| | | | |
|---|---|---|---|
| 4,729,605 | 3/1988 | Imao et al. ............................... | 301/104 |
| 4,919,490 | 4/1990 | Hopkins et al. ......................... | 301/63.1 |
| 5,110,190 | 5/1992 | Johnson .................................... | 301/55 |
| 5,246,275 | 9/1993 | Arredondo, Jr. ......................... | 601/64.7 |
| 5,350,221 | 9/1994 | Pearce et al. ............................ | 301/104 |
| 5,415,463 | 5/1995 | Olson et al. ............................. | 301/64.7 |
| 5,445,439 | 8/1995 | Dietrich .................................. | 301/58 X |
| 5,540,485 | 7/1996 | Enders .................................... | 301/104 |
| 5,769,584 | 6/1998 | Claes ...................................... | 301/58 X |
| 5,779,323 | 7/1998 | Burrows ................................ | 301/104 X |

*Primary Examiner*—Russell D. Stormer
*Attorney, Agent, or Firm*—Perman & Green, LLP

[57] ABSTRACT

A bicycle wheel system having spokes extending radially from hub to spoke. The spokes are provided with fittings at its rim end which are constructed with minimal mass and fittings at the hub end which allow adjustment of the tension of the spoke. The spokes are constructed of a bundle of liquid crystal fibers having no significant creep surrounded by an extruded plastic jacket.

21 Claims, 4 Drawing Sheets

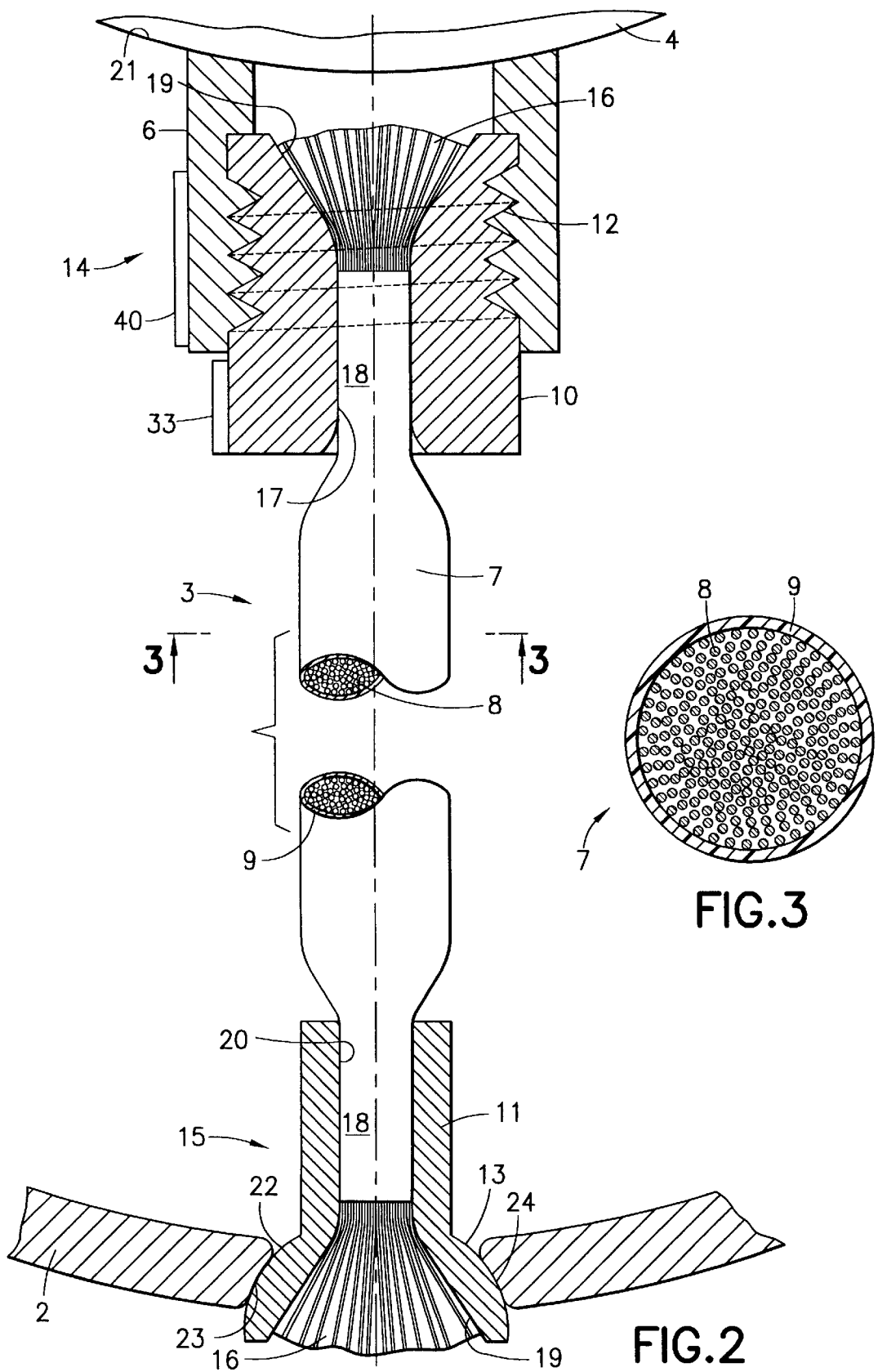

LOW ROTATIONAL MASS BICYCLE WHEEL SYSTEM

BACKGROUND OF THE INVENTION

Wire supported bicycle wheels consist of a hub supported by spokes of known shape within a circular rim. As the wheel rotates, the spokes are continuously subjected to compressive (at the bottom) and tensile (at the top) stresses. These cyclical stresses cause problems both in the structural portion of the spoke as well as in the fittings which attach the spoke to the rim and hub. It is a purpose of this invention to design a wheel system which minimizes the affect of these cyclical stresses.

The wheel, taken as system, must be designed to balance weight reduction with strength. It is a purpose of this invention to combine the highest strength materials in a system having low weight, with a primary goal of minimizing the rotational mass of the wheel. An essential part of this goal includes a method of manufacturing the wheel system which is inexpensive and efficient.

The assembly of spokes within the wheel system forms the critical element of the support structure for the wheel and is primarily responsible for the strength and performance characteristics of the wheel. The most efficient method of distributing forces within the spoke assembly is to assemble the wheel components in a manner that exerts the forces on the spoke body in a straight axially aligned pull without any bends or angles in the spoke. In addition the method of assembly must avoid winding or twisting the spoke along its length. It is a purpose of this invention to connect the spokes to the rim and hub by means of fittings which facilitate an axially alignment of the forces and avoids inducing torsional stresses.

U.S. Pat. No. 4,729,605 represents an attempt at accomplishing weight reduction by using fiber reinforced rods as the spokes. Chopped carbon fibers are mixed with a binder such as epoxy or aluminum to form a matrix. The matrix is formed into a spoke to which is attached a fitting at either end. The fitting which connects the spoke to the rim is threaded to enable adjustment of the tension. This is a rigid member with high cut strength and provides a weight reduction of between 3 and 4 grams per wheel. It is a purpose of this invention to reduce the weight of the wheel further while increasing the tensile strength of the spokes and lowering the mass of the rim. It is important to avoid abrasion and stress failures caused by the brittle nature of resin based fiber materials.

A non-rigid spoke is described in U.S. Pat. No. 5,110,190 which employs cylindrically or ribbon bundled aramid fibers such as KEVLAR® to form a spoke having fittings at either end. Although these fibers exhibit lower creep than some fibers, creep is nevertheless present. Creep causes a gradual elongation of the fibers which, in many ways, defeats any advantage gained by the non-rigid feature of the spoke of the '190 patent. The spokes will lose tension, the wheel will distort and realignment and truing will be required on a frequent basis. It is extremely difficult to maintain consistent tension on such spokes because of the affect of creep. It is a purpose of this invention to minimize creep while allowing a slight stretching of the fibers.

In addition the '190 patent ignores the important contribution of the fittings used to attach the spoke body to the rim and hub. The connections of spoke to rim and hub do not allow for an axial alignment of the forces at the point of connections and will cause the fibers to abrade against adjacent fibers under the cyclic stresses. The '190 patent also fails to recognize that aramid fibers deteriorate under exposure to ultra violet radiation. It is a purpose of this invention to minimize the effect of environmental influences on the spoke body.

SUMMARY OF THE INVENTION

In order to design a bicycle wheel with optimum performance and a large strength to weight ratio, while being resistant to cyclical stresses, it is necessary to give detailed attention to each component of the wheel. Therefore the rim, spoke, hub, and fittings, each have qualities that contribute to this invention. In particular a combined bicycle wheel system is designed to minimize rotational mass of the rim, while increasing the strength of the wheel both laterally and radially.

The rim is constructed with counter sunk eyelets to receive the spokes and facilitate universal pivoting of the spokes at the point of connection, thereby, directing forces along the spoke axis and avoiding twisting of the spoke during assembly and tension adjustment. The fittings which connect the spoke to the rim have minimized mass and assist in maintaining the fibers comprising the spoke body in axial alignment to maximize strength and reduce interfiber abrasion.

The hub is constructed to maximize its axial length and diameter. A cylindrical body portion houses the axle and bearings and alloy end flanges are bonded to each end of the hub body. The flanges have threaded fittings constructed to receive the spokes and direct the forces at the point of connection along the axis of the spoke.

The body of the spokes is constructed of a bundle of axial aligned, thermotropic liquid crystal fibers exhibiting essentially no creep characteristics and only slight stretch at the stresses encountered. The liquid crystal fibers are axially aligned, bundled, and drawn through a die which extrudes a plastic jacket around the bundled fibers. Fittings are fixed to either end of the spoke body by a bonded epoxy adhesive wedge. This results in a spoke body of parallel, axially aligned fibers encapsulated in a plastic jacket with means at either end for attachment to the hub and rim. When assembled in the wheel system, the spokes are oriented substantially radially and adjust at the hub end, while the attachment means provide a straight pull to the spoke to maximize fatigue resistance to the cyclical stresses.

The attachment fittings are designed with a tapered, generally conical inner passage to receive the spoke and hold the fibers in axial alignment. Each fitting is designed to engage with either the rim or hub to direct forces axially along the spoke at the point of connection and to minimize twisting. By bonding the fitting to the spoke body, the jacketed fiber bundle is sealed.

A spoke body constructed in the manner described in this application will have many advantages even when employed in prior art wheel systems, but these advantages are optimized when employed in the wheel system of this invention. This wheel system provides increased lateral stability, higher overall strength, reduced weight and superior performance by employing axial aligned fibers connected to receive a straight pull without torsional stress. The fibers are chosen to resist ultraviolet radiation and abrasion with substantially no creep and are protected by an extruded jacket which is sealed within the fittings bonded at either end.

DESCRIPTION OF THE DRAWING

The invention of this application is described in more detail below with reference to the Drawing in which:

FIG. 2 is a side view of a spoke of this invention, showing the fittings in section and the connections between the spokes, fittings, hub, and rim; and FIG. 3 is a cross section transverse to the axis of a spoke at the section line 3—3;

DESCRIPTION OF THE PREFERRED EMBODIMENT

Figure 1:
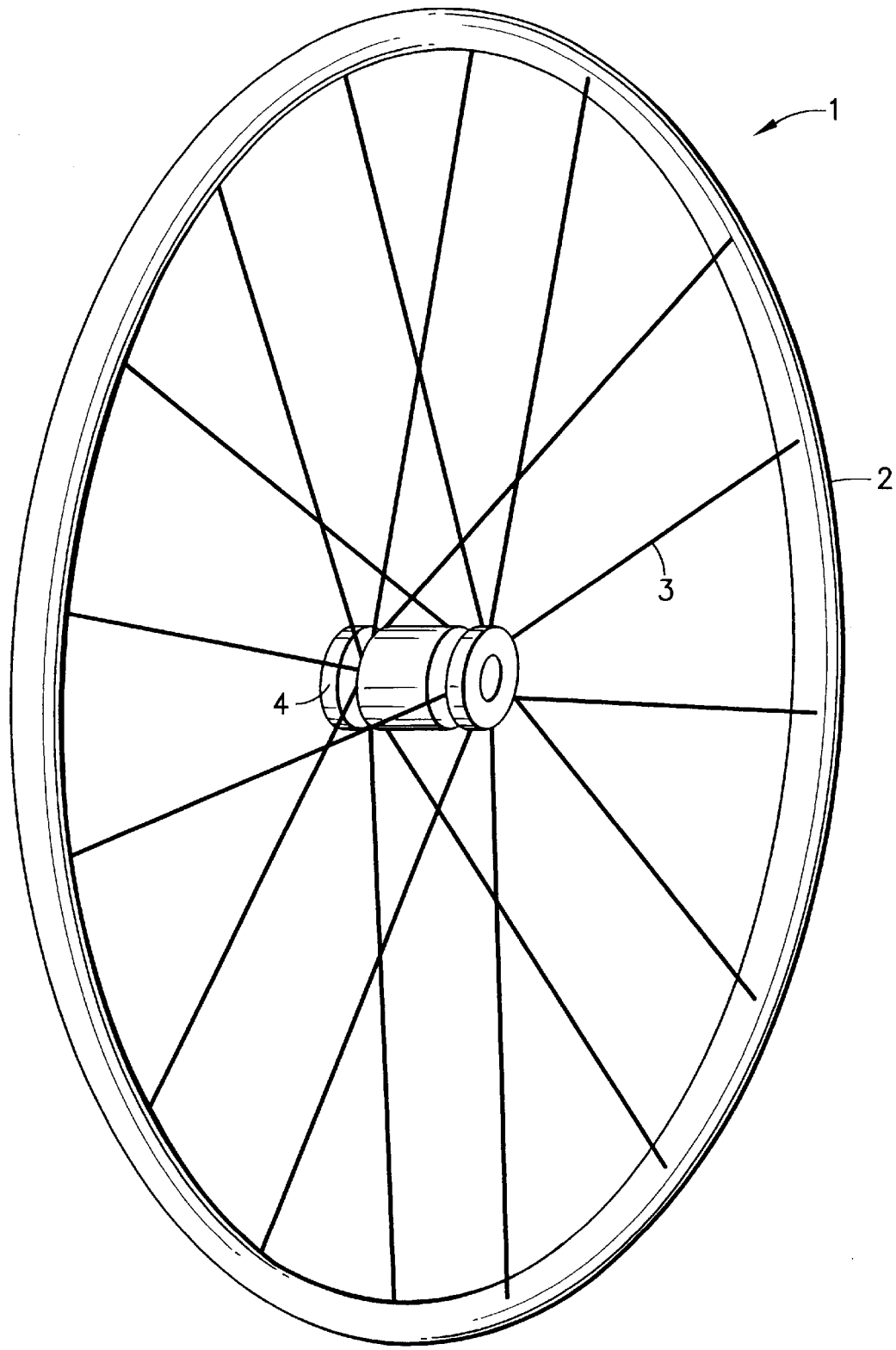
FIG. 1 is a perspective view of a wheel employing the spokes of this invention.

The wheel system 1 of this invention is shown in FIG. 1 and is comprised of a hub 4 supported on a rim 2 by means of spokes 3 which extend, under tension, substantially radially between the hub and rim. Referring to FIG. 2, the spoke 3 is connected, at its radially outer end 15, to the rim 2 by means of a fitting 11 and, at its radially inner end 14, to the hub 4 by means of a fitting 10 having external threads 12 in association with an internally threaded nipple 6. In the following description, the words inner and outer will be used to indicate the relative radial position of the various elements within the wheel system 1.

The spoke 3 is constructed of a bundle of thermotropic liquid crystal fibers 8 having substantially no creep. The fibers 8 are assembled and contained within an extruded tubular plastic jacket to form a composite spoke body 7 with the fibers 8 parallel and axially aligned. The composite body 7 is cut to an appropriate length and each end is assembled with a rim or hub engaging fitting to form the spoke 3.

The hub engaging fitting 10 is constructed in a cylindrical shape having external threads 12, as shown in FIG. 2. For clarity of illustration, the relative dimensions of FIG. 2 are exaggerated. A funnel shaped passage 17 is constructed within the fitting 10 to receive the inner end 14 of the spoke body 7. The tubular spout portion 18 of the passage 17 is of slightly smaller diameter than the spoke body 7 to hold the body 7 in a somewhat constricted condition. The head portion 19 of the funnel shaped passage 17 is formed in a substantially conical shape to allow the fibers 8 to expand when the plastic jacket is stripped. The transition between passage portions 18 and 19 has a gentle radius to avoid potential fatigue points. The hub fitting 10 is designed to engage the hub nipple 6 so that the force exerted on the spoke 3, at the connection to the hub 10, is aligned with the axis of the spoke 3.

The rim engaging fitting 11 is rivet shaped having an extended head portion 13. A funnel shaped internal passage 20 is constructed to receive the outer end of spoke body 8. The funnel shaped passage 20 is shaped and sized similarly to the passage 17 of the fitting 10 having a conical portion 19 and a spout portion 18. The rim fitting 11 is also designed to engage the rim 2 so that the force exerted on the spoke 3, at the connection to the rim 2, is aligned with the axis of the spoke 3. The mass of the fitting 11 is minimized by placing the tension adjustment mechanism at the hub. Since rotational mass is proportional to radius, the rotational mass is reduced.

In order to maximize the advantage of using parallel axial aligned fibers, it is important that the fittings 10 and 11 engage their respective wheel system elements for a straight pull, i.e. aligned with the spoke axis. No bends are created by the fittings after assembly is completed. Curved sections of fibers, such as the knots shown in the embodiments of the '190 patent cited above, aggravate the abrasive interaction of aramid or other high strength fibers, thereby decreasing fatigue resistance and limiting their usefulness. The combination of straight pull on radially extending spokes and the resiliency of the spokes avoids the perceived stiffness of rigid radially extending spokes and provides improved performance.

To form the body 7 of the spoke 3, the fibers 8 are assembled in bundles of 150 or more and passed through an extrusion die where the bundle is encapsulated with a thermoplastic jacket 9. It is advantageous to use a plastic material for the jacket that is abrasive resistant and impervious to ultra violet radiation, such as the material sold by ELF-Atochem under the trademark RILSAN®. The jacket 9 holds the fibers 8 in a tight bundle and helps maintain the fibers in axial alignment. The jacket 9 also allows an aerodynamic packaging of the fibers 8 to reduce wind resistance.

The fibers 8 are constructed of a thermotropic liquid crystal polymer such as the fibers sold by the Hoechst Celanese Corporation of Charlotte, N.C., under the trademark VECTRAN®. This material is chosen for its high resistance to creep which results in the substantial elimination of creep at the forces encountered in this application. In addition it has an exceedingly high strength to weight ratio which exceeds that of KEVLAR®. Aramid fibers, such as KEVLAR®, exhibit some creep at the forces involved and such creep is significant when used as a material for bicycle wheel spokes. Thermotropic liquid crystal polymers exhibit no creep at the forces involved and also have the advantage of being resistant to chemicals such as oils, gasoline, greases and many of the solvents encountered by a bicycle wheel in use. The high abrasion resistance of the fiber coupled with the outer plastic jacket provides a durable spoke with high flexure strength. In total the spoke of this invention is a significant improvement over those spokes constructed of aramid fibers.

The spoke body 7 is forced through the funnel shaped passages 17 and 20 with the fittings oriented for proper engagement with the hub 4 and the rim 2. The ends 14 and 15 of the spoke body 7 are stripped of the jacket 9 to expose the fibers 8 which will expand and fan outward as the stripped portion of the body 7 is seated in the passages 17 and 20. The constriction of the body 7 by the spout 18 of the passage 17 encourages an expansion of the fibers 8 to fill the conical portion 19 of passage 17. This constriction and expansion occurs in both fittings. The fibers 8 are stripped at a point below the junction of the spout portion 18 and conical portion 19.

Before the stripped end of the spoke body 7 is seated in its respective fitting, the end is immersed in an epoxy based adhesive which has low shrinkage during setting. The FX-752 HS, HYDRO-ESTER®, epoxy adhesive sold by Fox Industries, of Baltimore, Md., has been used with excellent results. This is an extremely tough adhesive used for industrial purposes and in construction to anchor bolts or wherever high bonding strength is required. A similar adhesive that exceeds the requirements of ASTM C-881-87 may also serve the purpose as long as it does not appreciably shrink as it sets.

To seat the fittings 10 and 11, they are moved outward on the spoke body 7 to engage the adhesive soaked expanded fibers 16 and encapsulate these fibers within the conical portions 19 of the fittings 10 and 11. Once set the ends of the spoke body 7 form a rigid conical wedge bonded to the fitting.

The rim 2 is constructed of light weight aluminum alloy or composite material and is designed to accommodate the fittings 11 of the spokes 3. An outer surface 21 is concave in shape to receive a tire in the standard fashion. By using a rim fitting 11, as shown in FIG. 2, the mass of the connection of the spoke to the rim is reduced and allows the rotational mass of the wheel to be minimized. Eyelets 22 are constructed through the rim 2 having spherical counter sunk sockets 23 which engage a mating portion 24 of the fitting 11. The engagement of the spherical mating portions provides a universal type of joint which allows the spoke to pivot as it is assembled to create and maintain a straight pull. It also allows the spoke 3 to turn in the socket 23 to avoid exerting torsional stresses on the spoke body 7.

Figure 4:
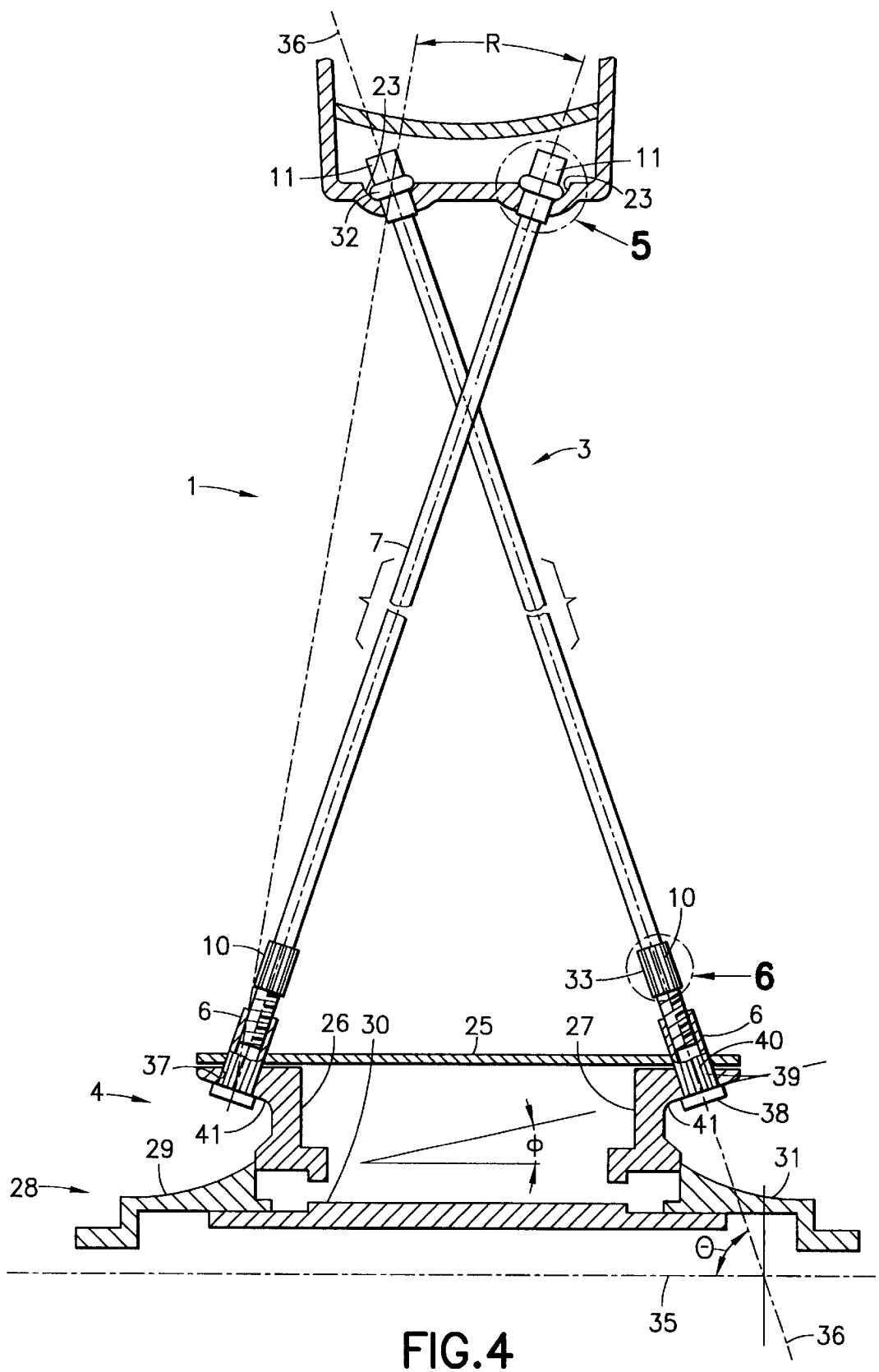
FIG. 4 is sectional view of a wheel system showing the hub and an embodiment of a high lateral strength spoke configuration.

The hub 4, as best shown in FIG. 4, is constructed of a cylindrical central body 25 and cylindrical end flanges 26 and 27 bonded to either end of body 25. Body 25 is made of a suitable high strength composite, such as carbon fiber in an epoxy matrix or other light weight material. The flanges are constructed of high strength machinable aluminum alloy and are formed with openings to accommodate the threaded nipple 6. As shown in FIG. 4, body 25 and flanges 26 and 27 overlap and are constructed with aligned openings 37, through which the nipple 6 is received. The inner surface of flange 26 and 27 is constructed with a flat seat 41 to receive the head 38 of the nipple 6. The seat 41 extends at an angle $\phi$ complimentary to the canting angle $\theta$ of spoke 3. Hub 4 supports axle assembly 28 comprising end caps 29 and 31 and shaft 30. The axle is attached to the bicycle through forks (not shown).

The threaded nipple 6 consists of a flat head 38 at its inner end and a tubular portion 39 extending outward therefrom. The tubular portion 39 is constructed with an internal threaded passage (see FIG. 2) and external splines 40, the former receiving the fitting 10 and the latter providing means to turn the nipple 6 to adjust tension. The nipple 6 is adapted to connect the hub end of spoke 3 and provides means to adjust the tension of the spoke 3 at its hub end.

The hub 4 of this invention is designed to maximize the advantage provided by the high strength and flexibility of the spokes 3. An improved lateral stability is achieved by extending the length of the hub and increasing the axially inward canting angle $\theta$ of the spoke to an angle in the range of 78° to 85° to the hub axis. This widens the spoke stance and results in improved lateral stability. In addition the diameter of the hub 4 is enlarged to shorten the length of the spokes 3. Providing shorter spokes reduces potential stretch and the enlarged hub diameter increases axial stiffness.

The wheel system 1 is assembled by inserting the spoke 3 through the eyelet 22 of rim 2 and engaging the hub fitting 10 into the threaded nipple 6 of the hub 4. The hub and rim connections are oriented so that the spokes 3 extend substantially radially outward and so that each spoke substantially follows in the plane of the adjacent spoke to reduce wind resistance. Because of the increased tensile strength of the spokes 3, fewer spokes are required. A total of 32 spokes are used to support the hub 4 on the rim 2 at an increased tension. This further enhances the aerodynamics of the wheel system 1. Each spoke of this invention weighs approximately 2 grams as opposed to 7 grams for a typical steel spoke and 4 grams for an aramid fiber spoke. A typical high strength wheel employs 36 spokes. That results in an overall weight of 252 grams for the steel spokes, 144 grams for the aramid fiber spokes, and only 64 grams for the spokes of wheel system 1 of this invention.

Figure 5:
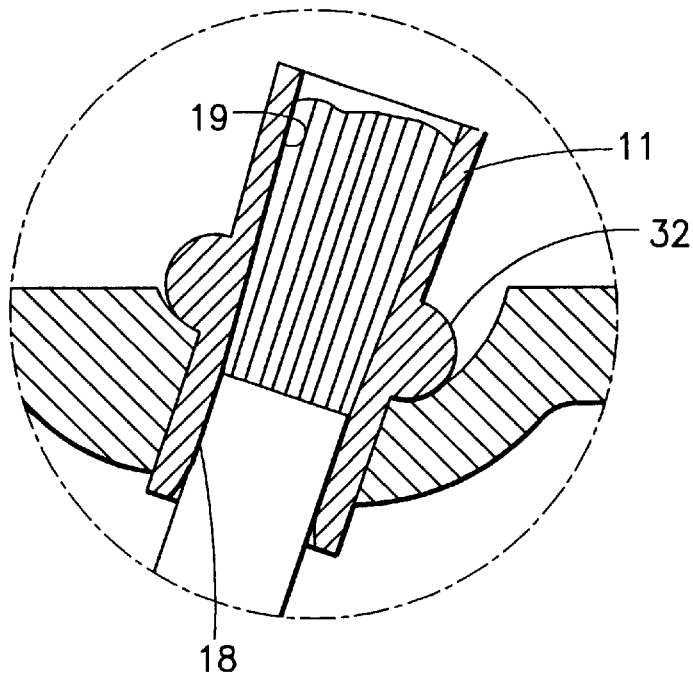
FIG. 5 is an enlarged cross sectional view of the rim attachment fitting of this invention.
Figure 6:
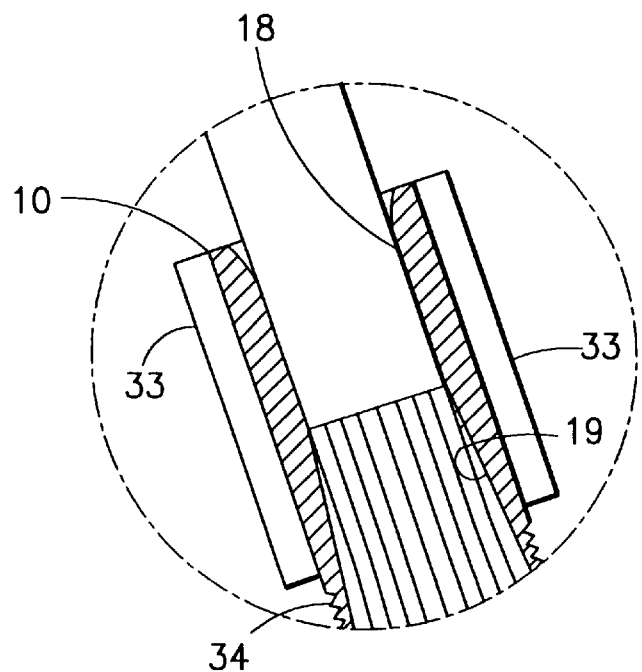
FIG. 6 is an enlarged cross sectional view of the hub attachment fitting of this invention.

Preferred embodiments of the fittings 10 and 11, which are constructed of a high strength aluminum alloy, are shown in FIG. 4, 5, and 6. The rim fitting 11 (FIG. 5) is constructed with a semi-cylindrical bead 32 extending around its outer circumference. The bead 32 is shaped to engage the socket 23 of eyelet 22 to form a simple universal joint. The spoke 3 is free to pivot and twist in the socket 23, thereby insuring a straight pull without any winding of the spoke body 7. The avoidance of winding enhances the fatigue life and increases the stiffness of the spoke 3 of this invention.

The hub fitting 10 (FIG. 6) is constructed with an outer head portion 42 and an inner tubular section 43. The tubular section 43 has external threads 34 which engage the internal threads of nipple 6. The head portion 42 is constructed with splines 33 which allow the spoke to be held in place while the nipple 6 is turned to engage the spoke fitting 10 and adjust the tension.

Both fittings are constructed with an inner passage to receive the spoke ends as previously described. As shown in FIGS. 5 and 6, the tubular portions 18 of the passages 17 and 20 are only slightly smaller in diameter than the spoke body 7 to receive the spoke body in a minimal force fit. The tapered portion 19 is constructed at a minimal angle, for example approximately 3°, thereby minimizing bending and maximizing alignment. The transition between passage portions is arcuate to avoid fatigue.

Because of the strength and stiffness advantages of the spokes of this invention, the canting angle $\Theta$ can be designed for a significant range (R) of spoke stances. As shown in FIG. 4, this range includes a unique embodiment in which the spokes 3 are crossed in the axial plane of the wheel. Spokes of the prior art have frequently been crossed in the circumferential plane of the wheel to increase fatigue resistance and improve damping. Axial lacing will accomplish these goals and dramatically increase lateral stability.

Through the more effective use of state of the art materials and high strength design, the wheel system of this invention provides performance that is significantly more responsive than prior art wheels, is stronger and lighter and is more durable. These advantages are provided by utilizing heretofore unattainable design features, namely, flexible, high strength, thermotropic liquid crystal fibers with no creep, parallel axial aligned fibers; radial spoke orientation; straight pull on the spokes; no spoke windup; and a wide axial spoke stance.

I claim:

1. A high performance bicycle wheel system having radially inner and outer elements comprising:

an outer circular rim constructed of high strength, low weight material, having a transverse cross section, constructed with a plurality of eyelets located on the inner portion of the cross section and spaced about the circumference of the rim;

an inner cylindrical hub mounted on an axle for concentric rotation with the rim about the axis of the axle, said hub constructed with attachment means for connection to a spoke;

a plurality of spokes, having a longitudinal axis, extending substantially radially outward from the hub to the rim, said spokes being connected to the rim through said eyelets and to said hub by said attachment means, said spokes comprising:

a bundle of thermotropic liquid crystal fibers that exhibit substantially zero creep extending generally axially within the spoke;

a plastic jacket extruded onto and encapsulating the bundle of fibers to form a spoke body; and a pair of fittings fixed to each end of the spoke body to connect to the rim and hub.

2. A high performance bicycle wheel system as described in claim 1 wherein said pair of fittings comprises:

a rim fitting fixed to the outer end of the spoke to engage the rim eyelet, said rim fitting and eyelet operatively associated to connect said spoke to said rim to allow the forces exerted on the spoke at the connection to be aligned with the axis of the spoke; and a hub fitting fixed to the inner end of the spoke to engage the attachment means of the hub, said hub fitting and said attachment means operatively is associated to connect said spoke to said hub to allow the forces exerted on the spoke at the connection to be aligned with the axis of the spoke.

3. A high performance bicycle wheel system as described in claim 2 wherein the eyelet in the rim is countersunk to form a semi-spherical socket and the rim fitting is formed with an external partially spherical surface which will engage the eyelet socket to form a universal joint.

4. A high performance bicycle wheel system as described in claim 2 wherein the attachment means of the hub is constructed with an internally threaded bore and the hub fitting of the spoke is formed with external threads constructed to engage the internal threads of the hub attachment bore.

5. A high performance bicycle wheel system as described in claim 1 wherein said spokes, in the assembled state, are oriented such that the longitudinal axis of the spoke is canted axially inward at angle to the axis of the hub which enables the outer end of the spoke to be attached to the rim over a range of positions on said rim cross section from the center of said cross section to the farthest most side of said cross section.

6. A high performance bicycle wheel system as described in claim 1 wherein said spokes, in the assembled state, are oriented such that the longitudinal axis of adjacent spokes is canted axially inward at angle which causes said axes to cross.

7. A high performance bicycle wheel system as described in claim 2 wherein each of the fittings are constructed with an internal passage extending axially through the fitting, having an enlarged portion and a tubular portion in which the tubular portion is constructed to slightly constrict the fiber bundle and the enlarged portion is constructed to allow expansion of the fiber bundle.

8. A high performance bicycle wheel system as described in claim 1 wherein the ends of the spoke within the enlarged portion of the fitting are stripped of the plastic jacket allowing the bundle to expand, said expanded portion of the bundle being bonded to the fitting by an adhesive.

9. A high performance bicycle wheel system as described in claim 8 wherein said adhesive exhibits low shrinkage during setting.

10. A high performance bicycle wheel system as described in claim 1 wherein said jacket is constructed of a material which is resistant to abrasion and deterioration from ultraviolet radiation.

11. A high performance bicycle wheel system as described in claim 1 wherein the fibers are parallel to and aligned with the axis of the spoke.

12. A method of constructing a spoke for a high performance bicycle wheel, said wheel consisting of a hub supported by spokes from a rim comprising the steps of:

bundling a plurality of fibers together to form a strand, said fibers constructed of thermotropic liquid crystal polymer;

drawing said strand through an extrusion die;

applying a plastic jacket to the strand as said strand is drawn through the extrusion die to form a spoke body;

cutting said spoke body into predetermined lengths suitable for use as spokes having a first and second end;

constructing a rim fitting and a hub fitting for connecting the spoke body to the rim and the hub respectively in a manner that provides a straight pull on the spoke body;

attaching said fittings to the first and second ends of the spoke body.

13. A method of constructing a spoke for a high performance bicycle wheel, said wheel consisting of a hub supported by spokes from a rim, as described in claim 12 wherein said jacket is constructed of a material which is resistant to abrasion and deterioration from ultraviolet radiation.

14. A method of constructing a spoke for a high performance bicycle wheel, said wheel consisting of a hub supported by spokes from a rim, as described in claim 12, wherein the step of constructing the fittings further comprises the step of:

constructing each of said fittings having an internal passage extending axially through the fitting, with an enlarged portion and a tubular portion in which the tubular portion is constructed to slightly constrict the strand and the enlarged portion is constructed to allow expansion of the strand; and wherein the step of attaching the fittings to the first and second ends of the spoke body comprises the further steps of:

inserting the spoke body through the fitting passage with the enlarged portion of said passage oriented facing outwards towards said first and second ends;

stripping a predetermined length of jacket from each of said first and seconds ends of the spoke body and allowing the fibers to expand;

immersing said first and second ends in a thermosetting adhesive;

engaging said fittings at the first and second ends of the spoke body to allow said adhesive soaked expanded fibers to fill the enlarged portion of said fitting passage; and bonding said fittings to the spoke body.

15. A spoke, having a longitudinal axis and first and second ends, for use in a bicycle wheel, said wheel consisting of a hub and a rim, said rim having eyelets constructed therein for receiving the spoke and said hub having attachment means for receiving the spoke, said spoke comprising:

a bundle of thermotropic liquid crystal fibers that exhibit substantially zero creep extending generally axially within the spoke;

a plastic jacket extruded onto and encapsulating the bundle of fibers to form a spoke body; and a pair of fittings fixed to each end of the spoke body to engage the eyelet and the attachment means to the spoke between the rim and hub.

16. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, said spoke, as described in claim 15, wherein said pair of fittings comprises:

a rim fitting fixed to the outer end of the spoke to engage the rim eyelet, said rim fitting and eyelet operatively associated to connect said spoke to said rim to allow the forces exerted on the spoke at the connection to be aligned with the axis of the spoke; and a hub fitting fixed to the inner end of the spoke to engage the attachment means of the hub, said hub fitting and said attachment means operatively associated to connect said spoke to said hub to allow the forces exerted on the spoke at the connection to be aligned with the axis of the spoke.

17. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, as described in claim 16, wherein the eyelet in the rim is countersunk to form a semi-spherical socket and the rim fitting is formed with an external partially spherical surface which will engage the eyelet socket to form a universal joint.

18. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, as described in claim 16, wherein the attachment means of the hub is constructed with an internally threaded bore and the hub fitting of the spoke is formed with external threads constructed to engage the internal threads of the hub attachment bore.

19. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, as described in claim 16, wherein each of the fittings are constructed with an internal passage extending axially through the fitting, having an enlarged portion and a tubular portion in which the tubular portion is constructed to slightly constrict the fiber bundle and the enlarged portion is constructed to allow expansion of the fiber bundle.

20. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, as described in claim 16, wherein the ends of the spoke within the enlarged portion of the fitting are stripped of the plastic jacket allowing the bundle to expand, said expanded portion of the bundle being bonded to the fitting by an adhesive.

21. A spoke, having a longitudinal axis and first and second ends, for use in a bicycle wheel, said wheel consisting of a hub and a rim, said rim having eyelets constructed therein for engaging said first end of the spoke and said hub having attachment means for engaging said second end of the spoke, as described in claim 20, wherein said adhesive exhibits low shrinkage during setting.

* * * * *